United States Patent Office 2,750,307
Patented June 12, 1956

2,750,307

INHIBITION OF MOISTURE TRANSMISSION THROUGH RIGID PERVIOUS MEDIA

Robert W. La Berge, Magnolia, N. J., assignor to E. I. du Pont de Nemours and Company, Wilmington, Del., a corporation of Delaware No Drawing. Application October 12, 1953,
Serial No. 385,713

15 Claims. (Cl. 117—123)

This invention relates to inhibition of water vapor transmission through rigid pervious media. More particularly it is concerned with a protective coating system which when applied to the surface of pervious materials exhibits superior resistance to moisture transmission.

This application is a continuation-in-part of my application Serial No. 353,675 filed May 7, 1953.

Moisture-blistering is one of the most prominent causes of failure of exterior house paints. Where a differential in atmospheric moisture conditions exists, a pervious barrier separating the two states of different moisture content serves as a membrane for transmission of water from the high level state to the state of lower level. This type of house paint failure is most common in the colder climates where the interior atmosphere is maintained at a substantially higher temperature than the exterior atmospheric temperature for prolonged periods. As a consequence, moisture of the humid interior atmosphere condenses on the inside of the outer wall and migrates through the outer wall to the painted surface and forces the paint loose in the form of blisters. Water, in its capillary migration through a pervious medium, is capable of exerting tremendous pressure. Such pressure is sufficient to overcome the adhesive forces binding a paint film to the pervious substrate. Under these conditions, the paint film is distorted by water and/or air filled blisters. Eventually a lower humidity of the interior atmosphere adjacent to the outer wall causes the water to disappear from the blisters. The blisters become deflated on loss of water, but seldom does the paint film return to its original undistorted condition. Hence, this condition results in premature failure of the paint by peeling and flaking.

Wooden house siding is a typical pervious membrane capable of transmitting moisture when the moisture on the inside of the house is at a higher level than that of the exterior atmosphere. The exteriorly applied paint is generally ineffectual in the inhibition of moisture transmission from an interior atmosphere condition of moisture content of higher level than that of the exterior atmosphere. Painting of both faces of the wooden membrane would be helpful in retarding the transmission of moisture under conditions of high moisture differential but it is impractical in practice.

The need for a water vapor barrier is well recognized today and better quality building construction employs a substantially non-pervious water and water vapor barrier, such as asphalt impregnated sheet material or aluminum foil, between the unprotected inner surface of the outer wall and the atmosphere of high moisture level. Obviously, the barrier must be an integral part of the original structure to provide an adequate seal against moisture transmission.

Another conventional means for minimizing moisture-blistering of house paint is to avoid a high humidity differential such that approximately equilibrium moisture conditions exist between the interior atmosphere in contact with the unpainted inner surface of the outer wall and the exterior atmosphere in contact with the painted outer surface. This is accomplished through the use of air-conditioning units, to maintain substantially constant condition, dehumidifiers to decrease the moisture content and exhaust fans to displace humid air with drier exterior air. Adequate equipment of this type is high in initial cost and expensive to operate. Where the exterior atmosphere is very cold it is practically impossible to prevent condensation of moisture on the cold wall from a warm humid interior atmosphere by the use of mechanical means of moisture reduction.

Of the described means of inhibiting moisture-blistering of house paints the vapor barrier provides a substantially impervious membrane supplementing the pervious wall and the mechanical devices merely alter the moisture level of the atmosphere in contact with the interface of the outside wall. This invention is still a different approach to the moisture transmission problem, which is more practical in that it concerns alteration of the rate of water transmission through the pervious walls with the result that the transmission of water and water vapor is significantly retarded.

In addition to the prevention of water vapor transmission from the inside of a room through an outer wooden wall, it is also desirable to prevent the transmission of water and water vapor from either the outside or inside through masonry walls, particularly in the basements of home construction.

It is an object of this invention to provide a method of retarding the transmission of water and water vapor through a pervious medium. A further object is the provision of a method of retarding water and water vapor transmission through wood, brick, concrete, stone and various forms of masonry. Another object is to provide a method of treating a pervious medium to minimize moisture-blistering of paint applied to the exposed surface. A further object is to provide a coating system characterized by improved resistance to moisture-blistering. Still further objects will become apparent to those skilled in the art from the detailed description given hereinafter.

These objects are accomplished by treating at least one surface of a rigid pervious medium with a composition comprised of an organo-soluble hydrophobic acylic polymeric titanium mixed ester, hereinafter defined. where the treated surface is a wooden surface a continuous coating of film forming material is applied over the treated surface which, in the absence of the surface treatment, will develop moisture-blistering. The polymeric titanium mixed ester consists of a chain of alternating titanium and oxygen atoms having a hydrophobic substituent A in the proportion of at least 0.5 molecular equivalent for each titanium atom, where A is a residual radical of an oxygenated organic compound of 8 to 24 carbon atoms selected from the class consisting of aliphatic monohydric alcohols and aliphatic monocarboxylic acids, minus the hydrogen of the respective functional groups. The remaining titanium linkages are satisfied with —OR radicals, where R is a radical selected from the class consisting of hydrogen and hydrocarbon radicals, and the hydrocarbon radical being selected from the class consisting of alkyl, cycloalkyl, aryl, and aralkyl radicals having 1 to 8 carbon chain length. The ratio of —OR radicals to titanium atoms is preferably about 1 or less.

In the preferred embodiment of the invention, the hydrophobic polymeric titanium mixed ester is a polymeric alkoxy titanium carboxylate such as is obtained by reacting an organic ester of orthotitanic acid, corresponding to the formula $Ti(OR)_4$ in which R is a hydrocarbon radical of a monohydric alcohol containing from 1 to 8 carbon atoms, with an anhydrous aliphatic monocarboxylic acid containing from 8 to 24 carbon atoms, employing 2 to 4 mols of carboxylic acid per mol of orthotitanate.

EXAMPLE I

|  | Percent by weight |
|---|---|
| Polymeric isopropoxy titanium stearate | 10 |
| Toluene | 90 |
|  | 100 |

The primer composition was applied to test blocks of wood, northern white pine measuring 2 x 1 x ¾ inches, by complete immersion for a 24 hour period, followed by drying for 24 hours at room temperature to volatilize the solvent. The treated block and an untreated block cut from the same original board were partially immersed in water at a depth of ⅓ of the length of the block, with end grain immersed. Under these conditions the untreated control shows transmission of water to the opposite end of the block in a few minutes. These blocks were weighed periodically to determine the increase in weight. The following table reveals the retarding action of the primer toward water absorption and adsorption.

*Table I*
INCREASE IN WEIGHT DURING WATER IMMERSION

|  | Example I Primer, percent | Untreated Control, percent |
|---|---|---|
| 1 minute | 0.5 | 7.8 |
| 5 minutes | 1.1 | 11.4 |
| 15 minutes | 1.4 | 15.0 |
| 60 minutes | 2.1 | 22.6 |
| 24 hours | 11.0 | 44.5 |
| 196 hours | 18.4 | 53.1 |
| 360 hours | 26.2 | 82.0 |
| 504 hours | 26.2 | 94.0 |
| 696 hours | 25.2 | 104.5 |
| 1,032 hours | 27.8 | 116.5 |
| 1,536 hours | 31.3 | 128.5 |
| 1,872 hours | 35.0 | 134.4 |
| 2,328 hours | 38.5 | 141.5 |

The results show that the surface of the treated block is substantially water repellent as indicated by the better than tenfold increase in weight by the control during the first sixty minutes' immersion in water in comparison with the treated block. For water-immersion periods of 24 hours and longer the average ratio of weight increase for the control in comparison with the treated wood was about 4 to 1, indicating a significant retarding effect on water absorption for the polymeric titanium mixed ester.

Table I further indicates that the control absorbed water equal to 30% of its original weight in about 9 hours. The treated wood reached this concentration of absorbed water in about 1350 hours.

A 30% increase in weight due to water absorption is recognized as a critical value since it corresponds with the amount of water capable of saturating the fiber structure of the wood. Water in excess of this content is free to move through the capillaries of the wood structure. Hence, in order for moisture-blistering to occur, the water content of the wood must be at least 30%.

EXAMPLE II

|  | Percent by weight |
|---|---|
| Polymeric isopropoxy titanium oleate | 10 |
| Toluene | 90 |
|  | 100 |

Wood treated with this primer and immersed in water reached a 30% increase in weight in about 163 hours or about 7 days.

The same polymeric titanium mixed ester applied at 1% concentration in toluene was less effective. In this instance the treated wood registered 30% increase in weight in about 21 hours.

At 5% concentration, the time required to reach 30% increase in weight by water absorption was about 35 hours.

At 20% concentration the primer was more effective, with the time required to reach 30% weight increase being at least 224 hours or about 9 days.

EXAMPLE III

|  | Percent by weight |
|---|---|
| Polymeric isopropoxy titanium linseed acylate | 5 |
| Toluene | 95 |
|  | 100 |

Wood treated with this primer was equally resistant to water absorption as wood primed with the polymeric isopropoxy titanium oleate of Example II. The following table shows comparative data of increase in weight of a wooden block treated and tested as described in Example I.

*Table II*

PERCENT GAIN IN WEIGHT OF WOODEN BLOCK[1] DURING WATER IMMERSION

| Time of Immersion in Water | 5 min. | 1 hr. | 1 day | 9 days | 15 days | 24 days | 30 days | 63 days |
|---|---|---|---|---|---|---|---|---|
| Untreated Control | 13.4 | 26.5 | 47.5 | 71.8 | 94.5 | 105.1 | 114 | 142 |
| 1% Polymeric Isopropoxy titanium oleate | 3.5 | 8.2 | 33.2 | 56.9 | 71.8 | 85.2 | 90.8 | 131 |
| 5% Polymeric Isopropoxy titanium oleate | 3.3 | 7.1 | 23.0 | 52.4 | 63.0 | 74.9 | 82.7 | 118.5 |
| 10% Polymeric Isopropoxy titanium oleate | 1.6 | 4.2 | 16.5 | 35.2 | 42.0 | 49.4 | 57.7 | 100.2 |
| 20% Polymeric Isopropoxy titanium oleate | 1.5 | 3.3 | 14.5 | 29.8 | 33.2 | 40.2 | 44.9 | 79.2 |
| 1% Polymeric Isopropoxy titanium linseed acylate | 6.0 | 10.0 | 36.5 | 64.0 | 77.1 | 92.2 | 106.1 | 144.5 |
| 5% Polymeric Isopropoxy titanium linseed acylate | 2.8 | 5.3 | 19.0 | 39.2 | 47.0 | 57.4 | 70.8 | 131.5 |
| 10% Polymeric Isopropoxy titanium linseed acylate | 2.6 | 5.0 | 17.2 | 35.2 | 41.7 | 50.2 | 59.4 | 110 |
| 20% Polymeric Isopropoxy titanium linseed acylate | 2.3 | 5.1 | 18.3 | 30.0 | 34.9 | 40.0 | 44.4 | 90.8 |

[1] Northern white pine 2" x 1" x ¾".

Wood primed with monomeric titanium esters which are recognized water repellents offers a slight advantage over untreated wood for short periods of water immersion, that is, for less than 24 hours. Although water-repellent, the wood treated with the monomeric titanium esters does not show the significant retarding of water absorption when the end grain is immersed in water for extended periods. The following table shows the water absorption of wood primed with a 10% toluene solution of monomeric titanates and polymeric titanium esters, when tested as described in Example I.

Table III
PERCENT GAIN IN WEIGHT OF WOODEN BLOCK DURING WATER IMMERSION

| Time of Immersion In Water | 1 Hour | 24 Hours |
|---|---|---|
| Treating Agent: | | |
| Monomeric Tetrabutyl Titanate | 6.1 | 17.6 |
| Monomeric Octylene Glycol Titanate | 5.4 | 21.8 |
| Monomeric Tetrastearyl Titanate | 5.4 | 20.9 |
| Monomeric Tetraacetylphenyl Titanate | 7.0 | 26.2 |
| Monomeric Tetraisopropyl Titanate | 13.3 | 30.6 |
| Monomeric Tetraoctyl Titanate | 6.6 | 20.0 |
| Polymeric Isopropoxy Titanium Stearate | 2.1 | 11.0 |
| Polymeric Isopropoxy Titanium Soya Acylate | 3.0 | 12.3 |

Polymeric butoxy titanium stearate used in place of the polymeric isopropoxy titanium carboxylates of Examples I, II and III produced similar results.

EXAMPLE IV

| | Percent by weight |
|---|---|
| Polymeric titanium mixed ester | 10 |
| Xylol | 90 |
| | 100 |

The polymeric titanium mixed ester used in this example corresponds essentially to a dimer containing about two butyl groups and four stearyl groups per molecule which was the product of the reaction of 40 parts of preformed polymeric tetrabutyl orthotitanate and 100 parts of stearyl alcohol involving partial elimination of butyl alcohol.

Results attained with the use of the primer of Example IV were comparable with those observed with the use of polymeric butoxy titanium stearate and similar polymeric alkoxy titanium carboxylates. The results show that the hydrophobic nature of the long carbon chain substituents is effective whether the linkage to the titanium atom is through a carboxyl bond or an alkoxy bond.

The foregoing data show the significant retarding of moisture absorption of wood by treating it with polymeric titanium mixed esters. Practical tests show that the water absorption data correlate closely with the water transmission through wood and blister formation on the exposed side of painted wood surfaces.

In carrying out practical tests, white pine and red cedar boards dressed to ¾ x 6 x 36 inches were selected as the substrate. Each board was sectioned with one-half to represent the untreated control and the other half the primed surface. In preparing the primed half, two coats of a 10% polymeric titanium ester solution in toluene, was brushed on the side to be painted. Two coats of titanium dioxide pigmented linseed oil house paint, having a covering power of 500 square feet per gallon were applied over the primed surface and the control surface to provide a film thickness of about 5 mils. The panels were aged by vertical south outdoor exposure for two months and then sampled for testing. A 9 inch section was taken from each end of the panel for evaluation. Flat discs 3½ inches in diameter were cut from the panel samples and floated in water for two days with the unpainted side down to saturate the wood. The soaked discs were then placed in a vacuum vessel under 30 mm. Hg pressure for 30 minutes to eliminate entrapped air and then again floated on water for three days. The soaked discs were evaluated for adhesion of the paint by assembling the disc as a diaphragm of an open face pressure bomb. Pressure of an inert gas, such as nitrogen, was applied until the paint film showed signs of initial formation of blisters and the pressure was thereafter increased at 5 pound increments until the degree of blistering advanced. Less than one pound pressure was required to initiate blistering of the paint film over both the untreated or the primed substrate while wet with water at the paint-wood interface. These results show that priming the wood in accordance with this invention does not enhance the adhesion of the paint film. Still other tests show that the presence of a polymeric titanium mixed ester was not detrimental to adhesion.

It was surprising and unexpected that materials which do not enhance adhesion of the paint film to a substrate would improved moisture-blistering.

A paint film which exhibits moisture-blistering over an untreated wooden substrate will also show moisture-blistering over wood primed in accordance with this invention when sufficient water has been transmitted through the wood. Hence, the mode of preventing blistering resides in adequately retarding water transmission. It is immaterial that wood primed in accordance with this invention, on lengthy exposure to water pressure, eventually transmits an amount of water in excess of the amount required for fiber saturation (30%) because, in less length of time, fluctuation of the humidity of the atmosphere in contact with the wood will cause the moisture in the wood to move out of the wooden structure to approach equilibrium conditions at a water content below that required to cause blistering.

The remaining portion of the weathered test panel was subjected to the following accelerated moisture-blister test. The test panel was subjected to conditions in which the painted side of the panel was in contact with an atmosphere maintained at a constant temperature of 35° F. and relative humidity of 40%. The unpainted side of the panel was in contact with an atmosphere maintained at 70° F. temperature and 70% relative humidity. The panel was examined every other day for 30 days for signs of blistering and rated. A scale of 0 to 10 was used, where 10 represents blister-free condition and 0 represents complete failure with respect to blistering using adopted photographic standards. The test panel portions treated with the polymeric titanium mixed ester compositions of the examples were rated 10. The untreated control portions of the test panels ranged in blister rating from 6.0 to 8.0 at the end of the normal 30 day exposure test.

Wood primed with monomeric tetralkyl titanates, such as tetrabutyl titanate and tetraisopropyl titanate, having no long chain substituents greater than 8 carbon atoms showed the same degree of blistering as the untreated control.

Use of polymeric titanium mixed esters and monomeric titanate esters as an additive to the paint composition showed no improvement in the blistering characteristics of the paint.

The examples show use of toluene and xylol as the volatile carrier for the polymeric titanium mixed esters. The invention is not limited to these specifically named solvents. Other hydrocarbons, such as petroleum naphthas, mineral spirits, and other volatile solvents and diluents used in conventional paint formulation may be used. Esters, alcohols and ethers, either alone or in admixture with hydrocarbons, are also useful vehicles for the polymeric titanium mixed esters. The pertinent requirement for the solvent is that it be substantially anhydrous to minimize hydrolysis.

Primers containing as little as 1% of polymeric titanium mixed ester have been found to be effective. Liquid esters may be used at 100% concentration, but inasmuch as the polymeric titanium mixed esters are generally waxy solids, they are most effectively applied from solution or dispersion at a concentration preferably in the range of 5 to 25%. Application of the primer may be by dipping, brushing, spraying, roller coating and other conventional means of applying liquid coating compositions.

If desired, the primer compositions may be modified with adjuvants, such as, e. g. pigments, dyes, fillers and bodying agents, which are compatible and non-reactive with the polymeric titanium mixed esters.

The use of the primer compositions of this invention on wooden surfaces is primarily in combination with conventional drying oil paints, but the coating superimposed over the primed surface may be alternatively varnishes, lacquers and synthetic resin finishes, clear and pigmented, which are conventionally applied to wood subject to outdoor weathering. These latter finishes generally are more resistant to moisture-blistering than conventional oil paint.

While the foregoing examples illustrate the retardation of moisture-blistering of exterior house paints applied to wood, the invention is also useful in treating other porous construction materials, such as, e. g., various forms of masonry, whether or not paint is applied over the treated surface. The following examples illustrate this form of the invention.

EXAMPLE V

One portion of the side of an ordinary building brick which is normally exposed to the outside was brushed with a 2% solution of polymeric isopropoxy titanium stearate in toluene and allowed to air dry for four days. Approximately 1¼ grams of the solution were applied per square inch of the brick surface. The treated brick was tested for waterproofness as follows:

The treated side of the brick was sealed to a hollow glass cylinder 14 inches long, 1¼ inches in diameter and open at both ends, using a molten mixture of equal parts of beeswax and rosin as the cement. Into the cylinder in a vertical position with the brick as the base was poured a 12 inch column of water.

A control test was also carried out in which a portion of the same building brick which had not been treated for waterproofness was also cemented to a similar hollow glass cylinder as described above and the cylinder filled with a 12" column of water.

The rate at which the water level fell in each column was observed and the results are shown in the following table:

| Surface Treatment on Brick | | Drop in Water Level In Cylinder After 24 Hrs. |
|---|---|---|
| Example V | 2% Solution of Polymeric Isopropoxytitanium stearate (1.25 g./sq. inch). | None. |
| Control | None | 10 inches. |

Similar results were obtained when tests were carried out on two bricks mortared together and treated with the two percent solution of polymeric isopropoxytitanium stearate, the water permeability of the mortar joint being measured.

EXAMPLE VI

Part of the brick wall in a building was brushed with a 2% solution of polymeric isopropoxytitanium stearate in toluene. The amount applied being approximately .15 g. of the solution per square inch of surface which corresponds to .003 g. of dry polymer per square inch. Within six hours no evidence of the treatment was visible. After a month's exposure to bright sunlight during most of the days and frequent rains, the treated part of the wall showed no discoloration. After the one month's exposure a fine jet of water directed against the treated portion of the wall was mostly repelled, whereas water similarly sprayed against an untreated part of the wall was almost entirely absorbed by the masonry.

The amounts of polymeric alkoxytitanium acylates needed to waterproof masonry depend upon the kind of masonry, the degree of waterproofness desired and the particular acylate to be used. For waterproofing masonry acylates with saturated carboxylic acid groups such as polymeric isopropoxytitanium stearate are preferred over unsaturated acylates such as the corresponding oleates, although the latter are useful in carrying out this invention. As little as .0025 g. of the dry polymer per square inch of masonry is very effective for waterproofing but larger amounts may often be desirable. The polymeric acylate may be pigmented or modified with agents such as plasticizers and the resulting compositions of matter applied to masonry as paints which are not only decorative but highly water repellent. Either clear or pigmented solutions of the compositions of this invention may be applied by spraying or brushing.

Polymeric titanium mixed esters useful in the practice of this invention are those in which the chain of titanium atoms bridged with oxygen linkages have a hydrophobic substituent A in the molecular equivalent proportion of at least 0.5 substituent A and preferably not more than 1.5 for each titanium atom, where substituent A is a residual radical resulting from elimination of a functional hydrogen atom from a hydrophobic oxygenated organic compound selected from the class consisting of monohydric alcohols and monocarboxylic acids having 8 to 24 carbon atoms, and preferably 12 to 20 carbon atoms. The remaining titanium linkages are satisfied with —OR radicals, where R is a radical selected from the class consisting of hydrogen and hydrocarbon radicals, the hydrocarbon radicals being selected from the class consisting of alkyl, cycloalkyl, aryl and aralkyl radicals having no more than 8 carbon atoms. The ratio of —OH radicals to titanium atoms is preferably about 1 or less. The hydrocarbon radicals are derived from monohydric alcohols, such as, e. g. methyl, ethyl, propyl, isopropyl, butyl, cyclohexyl, 2-ethyl hexyl, octyl, ethoxy ethyl, benzyl and phenyl.

Representative polymeric titanium carboxylates and mixed esters as defined above are illustrated by the following empirical formulae:

1. Polymeric alkoxy titanium carboxylates:

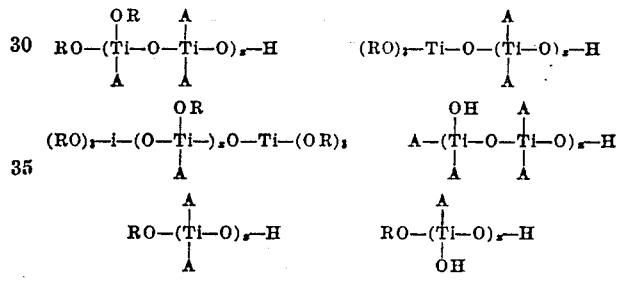

where R is a hydrocarbon radical as defined above X is a whole number greater than 1; and A is a monocarboxylic acid radical having at least 8 carbon atoms, such as stearic, lauric, oleic, palmitic, ricinoleic, linoleic, myristic, caprylic, capric, nonylic linseed oil acids castor oil acids, cocoanut oil acids, soya bean oil acids, tung oil acids, tall oil acids, and fish oil acids.

2. Polymeric alkoxy mixed titanate esters:

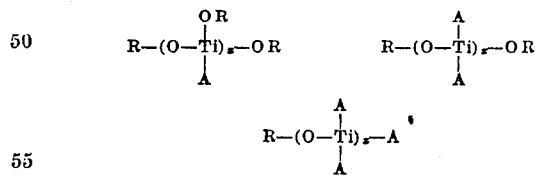

where R is a hydrocarbon radical as defined above, X is a whole number greater than 1; and A is the residual radical of a monohydric alcohol of at least 8 carbon atoms minus the hydroxyl hydrogen, such as, for example, stearyl alcohol, lauryl alcohol, and octyl alcohol.

It is desirable that at least one alkoxy substituent per molecule of polymeric titanium mixed ester be the derivative of a readily volatile alcohol. The following theory might be an explanation of how the invention functions, but it is to be understood that the invention is not to be limited by theoretical explanation. It may be that the polymeric titanium ester is chemically attracted to the wood structure by hydrogen bonding between the polymeric titanate and the wood structure. This chemical bonding of the polymer to the wood structure might orient the polymer such that hydrophobic long carbon chain substituents protrude to repel the water.

Still more complex polymeric titanium ester mixtures represented by mixing the polymeric titanium carboxylates and the polymeric titanate mixed esters are useful in the practice of this invention.

The polymeric titanium carboxylates useful in the practice of this invention are prepared by reacting a monomeric orthotitanate ester having the formula Ti(OR)$_4$ where R is a hydrocarbon radical selected from the group consisting of alkyl, cycloalkyl, aryl and aralkyl, having no more than 8 carbon atoms, with at least 2 mols of an anhydrous, aliphatic monocarboxylic acid per mol of titanate as disclosed in U. S. Patent 2,621,193.

The polymeric titanium carboxylates may be prepared also by reacting a monomeric orthotitanate ester having the formula Ti(OR)$_4$ with an 8 to 24 carbon atom carboxylic acid in the presence of 1 to 2 mols of water per mol of orthotitanate as disclosed in U. S. Patent 2,621,195.

Still another means of preparing polymeric titanium carboxylates useful in the practice of this invention is by reacting a titanium tetrahalide with an aliphatic monocarboxylic acid of 8 to 24 carbon atoms in the presence of 1 to 2 mols of water per mol of tetrahalide as described in U. S. Patent 2,621,194.

Useful polymeric titanium mixed esters having alkoxy substituents of different carbon chain lengths, but containing no carboxylic acid radicals may be prepared by reacting a preformed polymeric ester of orthotitanic acid derived of lower aliphatic alcohols and phenols having no more than 8 carbon atoms with a monohydric aliphatic alcohol containing more than 8 carbon atoms as described in U. S. Patent 2,614,112.

It will occur to one skilled in the art that the invention may be extended to embodiments other than those specifically disclosed and therefore it is intended that the scope of the invention shall not be so limited except as defined by the appended claims.

I claim:

1. A method of retarding transmission of water and water vapor through porous masonry normally pervious to water and water vapor which comprises substantially impregnating exposed pores of said masonry without sealing them, with a liquid composition consisting essentially of an acyclic polymeric titanium mixed ester as the nonvolatile portion, said ester being a chain of alternating titanium and oxygen atoms with hydrophobic substituent A attached to titanium atoms in the proportion of at least .5 substituent A per titanium atom, where substituent A is a residual radical of an oxygenated organic compound of 8 to 24 carbon atoms selected from the class consisting of aliphatic monocarboxylic acids and aliphatic monohydric alcohols, minus hydrogen of the respective functional groups, the remaining titanium linkages being satisfied with —OR radicals, where R is a radical selected from the group consisting of hydrogen and hydrocarbon radicals, the hydrocarbon radical being selected from the group consisting of alkyl, cocyloalkyl, aryl and aralkyl radicals having no more than 8 carbon atoms, and the ratio of —OH radicals being not greater than about one per titanium atom, said liquid composition being adequately low in viscosity for penetration into said exposed pores of said masonry to deposit said polymeric titanium ester in said pores after volatilization of the solvent and diluents without any substantial quantity remaining on the surface.

2. The method of claim 1 in which the composition is a polymeric titanium mixed ester dispersd in a volatile, substantially anhydrous organic liquid containing at least one solvent for the polymeric titanium ester.

3. The method of claim 1 in which the polymeric titanium mixed ester is a polymeric alkoxy titanium carboxylate.

4. The method of claim 1 in which the hydrophobic substituent A of the polymeric titanium mixed ester is an alkoxy group having a chain length of 12 to 20 carbon atoms.

5. The method of claim 1 in which the polymeric titanium mixed ester is a polymeric isopropoxy titanium carboxylate.

6. The method of claim 1 in which the polymeric titanium mixed ester is a polymeric butoxy titanium carboxylate.

7. The method of claim 1 in which the polymeric titanium mixed ester is a polymeric isopropoxy titanium stearate.

8. The method of claim 1 in which the polymeric titanium mixed ester is a polymeric alkoxy titanium ester having at least one alkoxy group of not more than 8 carbon atoms and at least one stearyl group per molecule.

9. The method of claim 1 in which the masonry is brick.

10. Porous masonry characterized by improved resistance to water and water vapor transmission, having exposed pores of said masonry impregnated with a composition consisting essentially of an acyclic polymeric titanium mixed ester, said ester being a chain of alternating titanium and oxygen atoms with hydrophobic substituent A attached to titanium atoms in the proportion of at least .5 substituent A per titanium atom, where substituent A is a residual radical of an oxygenated organic compound of 8 to 24 carbon atom content selected from the class consisting of aliphatic monocarboxylic acids and aliphatic monohydric alcohols, minus hydrogen of the respective functional groups, the remaining titanium linkages being satisfied with —OR radicals, where R is a radical selected from the group consisting of hydrogen and hydrocarbon radicals, the hydrocarbon radical being selected from the group consisting of alkyl, cycloalkyl, aryl and aralkyl radicals having no more than 8 carbon atoms, and the ratio of —OH radicals not exceeding about one per titanium atom, said composition being deposited in the pores of said masonry without any substantial quantity remaining on the surface.

11. The product of claim 10 in which the masonry is brick.

12. The product of claim 10 in which the mixed ester is polymeric alkoxy titanium carboxylate.

13. The product of claim 10 in which the mixed ester is polymeric isopropoxy titanium stearate.

14. The product of claim 10 in which the mixed ester is polymeric butoxy titanium stearate.

15. The product of claim 10 in which the mixed ester is a polymeric alkoxy titanium ester having at least one alkoxy group of not more than 8 carbon atoms and at least one stearyl group per molecule.

References Cited in the file of this patent

UNITED STATES PATENTS

| | | |
|---|---|---|
| 2,557,786 | Johannson | June 19, 1951 |
| 2,621,193 | Langkammerer | Dec. 9, 1952 |
| 2,621,194 | Balthis | Dec. 9, 1952 |
| 2,621,195 | Haslam | Dec. 9, 1952 |
| 2,680,723 | Kronstein | June 8, 1954 |

FOREIGN PATENTS

| | | |
|---|---|---|
| 125,450 | Australia | Sept. 25, 1947 |

OTHER REFERENCES

Vandewalker: Woodfinishing, 1944, pages 246 and 247.